US008642667B2

(12) United States Patent
Abbott

(10) Patent No.: US 8,642,667 B2
(45) Date of Patent: Feb. 4, 2014

(54) PROCESS FOR INCREASING HYDROGEN CONTENT OF SYNTHESIS GAS

(75) Inventor: Peter Edward James Abbott, Eaglescliffe (GB)

(73) Assignee: Johnson Matthey PLC, London (GB)

( * ) Notice: Subject to any disclaimer, the term of this patent is extended or adjusted under 35 U.S.C. 154(b) by 390 days.

(21) Appl. No.: 13/056,765

(22) PCT Filed: Jul. 10, 2009

(86) PCT No.: PCT/GB2009/050820
§ 371 (c)(1),
(2), (4) Date: Jan. 31, 2011

(87) PCT Pub. No.: WO2010/013026
PCT Pub. Date: Feb. 4, 2010

(65) Prior Publication Data
US 2011/0137089 A1    Jun. 9, 2011

(30) Foreign Application Priority Data
Aug. 1, 2008 (GB) .................................. 0814053.5

(51) Int. Cl.
*C07C 27/00* (2006.01)
*C01B 3/26* (2006.01)
*C01B 3/16* (2006.01)
(52) U.S. Cl.
USPC ........... 518/700; 518/703; 518/704; 423/651; 423/655
(58) Field of Classification Search
USPC ................... 518/700, 703, 704; 423/651, 655
See application file for complete search history.

(56) References Cited

U.S. PATENT DOCUMENTS

| | | | |
|---|---|---|---|
| 3,666,682 A | 5/1972 | Muenger | |
| 4,788,175 A | 11/1988 | Short et al. | |
| 2010/0190874 A1* | 7/2010 | Mamedov et al. | ............ 518/702 |

FOREIGN PATENT DOCUMENTS

| | | |
|---|---|---|
| EP | 0278063 | 3/1993 |
| WO | 2009019497 | 2/2009 |

OTHER PUBLICATIONS

Chiesa et al., "Co-production of hydrogen, electricity and $CO_2$ from coal with commercially ready technology. Part A: Performance and emissions," *International Journal of Hydrogen Energy*, vol. 30, No. 7, Jul. 1, 2005, pp. 747-767.
International Search Report dated Oct. 29, 2009.

\* cited by examiner

*Primary Examiner* — Jafar Parsa
(74) *Attorney, Agent, or Firm* — RatnerPrestia

(57) ABSTRACT

A process for increasing the hydrogen content of a synthesis gas containing one or more sulphur compounds is described, comprising the steps of (i) heating the synthesis gas and (ii) passing at least part of the heated synthesis gas and steam through a reactor containing a sour shift catalyst, wherein the synthesis gas is heated by passing it through a plurality of tubes disposed within said catalyst in a direction co-current to the flow of said synthesis gas through the catalyst. The resulting synthesis gas may be passed to one or more additional reactors containing sour shift catalyst to maximize the yield of hydrogen production, or used for methanol production, for the Fischer-Tropsch synthesis of liquid hydrocarbons or for the production of synthetic natural gas.

22 Claims, 2 Drawing Sheets

US 8,642,667 B2

PROCESS FOR INCREASING HYDROGEN CONTENT OF SYNTHESIS GAS

CROSS-REFERENCE TO RELATED APPLICATIONS

This application is the U.S. National Phase application of PCT International Application No. PCT/GB2009/050820, filed Jul. 10, 2009, and claims priority of British Patent Application No. 0814053.5, filed Aug. 1, 2008, the disclosures of both of which are incorporated herein by reference in their entirety for all purposes.

FIELD OF THE INVENTION

This invention relates to a process for increasing the hydrogen content of a synthesis gas, in particular increasing the hydrogen content of a synthesis gas generated from a carbonaceous feedstock.

BACKGROUND OF THE INVENTION

Synthesis gas, also termed syngas, may be generated by a gasification of carbonaceous feedstocks such as coal, petroleum coke or other carbon-rich feedstocks using oxygen or air and steam at elevated temperature and pressure.

For the production of methanol or hydrocarbons, the desired stoichiometry ratio, R, which refers to the ratio of molar concentrations of the gas components, $[R=(H_2-CO_2)/(CO+CO_2)]$, is preferably in the range 1.4 to 2.5. For generating synthetic natural gas (SNG) the range is preferably in the range 2.8 to 3.3. Other processes (e.g. ammonia production, extraction of hydrogen for use in fuel cells or in a gas turbine) require maximising the yield of hydrogen. To achieve this, it is necessary to subject the raw synthesis gas to the water-gas-shift reaction by passing it, in the presence of steam, over a suitable water gas shift catalyst at elevated temperature and pressure. The $CO_2$ that is formed is then removed in a downstream gas washing unit to give the desired R ratio or hydrogen rich product gas. The synthesis gas generally contains one or more sulphur compounds and so must be processed using sulphur-resistant catalysts, known as "sour shift" catalysts. The reaction may be depicted as follows;

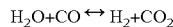

This reaction is exothermic, and conventionally it has been allowed to run adiabatically, i.e. without applied cooling, with control of the exit temperature governed by feed gas inlet temperature, composition and by by-passing some of the synthesis gas around the reactor.

Side reactions can occur, particularly methanation, which is usually undesirable. To avoid this, the shift reaction requires considerable amounts of steam to be added to ensure the desired synthesis gas composition is obtained with minimum formation of additional methane. The costs of generating steam can be considerable and therefore there is a desire to reduce this where possible.

SUMMARY OF THE INVENTION

Accordingly, the invention provides a process for increasing the hydrogen content of a raw synthesis gas comprising hydrogen and carbon oxides and containing one or more sulphur compounds, comprising the steps of:

(i) heating the raw synthesis gas and
(ii) passing at least part of the heated raw synthesis gas and steam through a reactor containing a sour shift catalyst to form a shifted gas stream,
wherein the raw synthesis gas is heated by passing it through a plurality of tubes disposed within said catalyst in a direction co-current to the flow of said synthesis gas through the catalyst.

The invention further provides a shift reactor containing a bed of water gas shift catalyst having a plurality of cooling tubes disposed therein, wherein said reactor and tubes are configured such that a synthesis gas may be passed through the tubes in one direction and then passed through the catalyst in substantially the same direction.

By heating the raw synthesis gas in the shift reactor in a co-current arrangement we have found it is possible to reduce the amount of steam required to obtain a desirable synthesis gas composition.

BRIEF DESCRIPTION OF THE DRAWINGS

The invention is further illustrated by reference to the accompanying drawings in which.

DETAILED DESCRIPTION OF THE INVENTION

Figure 1:
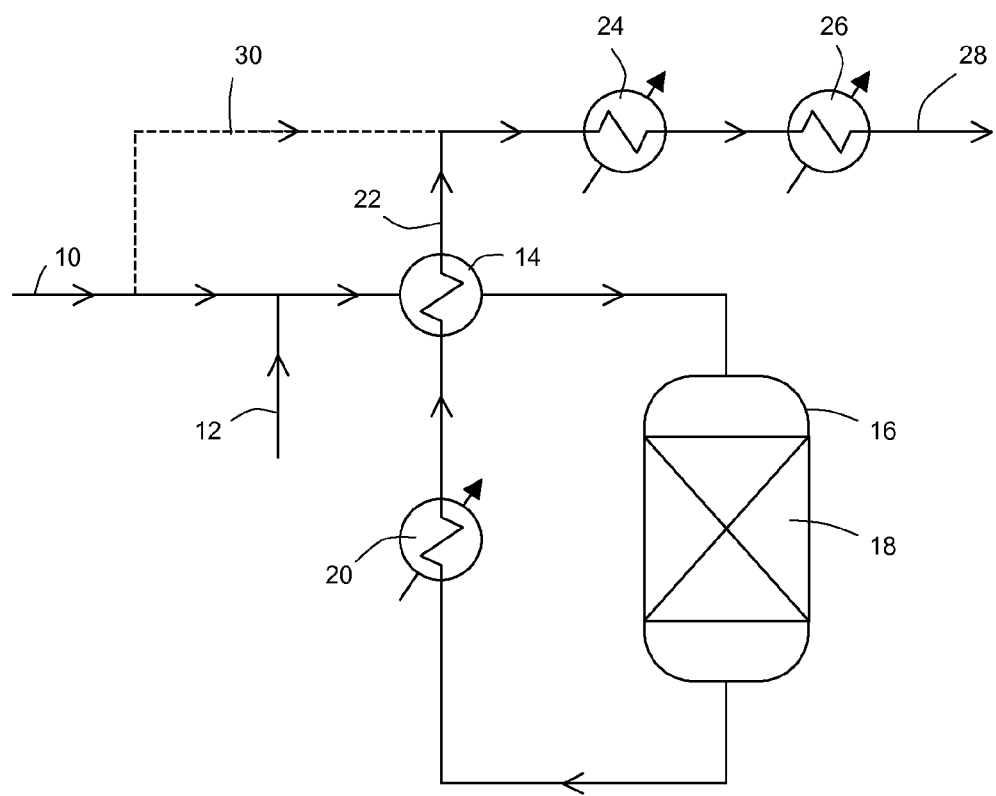
FIG. 1 is a depiction of a comparative process in which a raw synthesis gas mixture is fed to a conventional un-cooled sour shift reactor.

In the present invention the raw synthesis gas comprising hydrogen and carbon oxides and containing one or more sulphur compounds may be produced by any method although it is particularly suited to synthesis gas produced by gasification of a carbonaceous feedstock at elevated temperature and pressure. Any known gasification technology may be used. The carbonaceous feedstock may be coal, petroleum coke or another carbon-rich feedstock. Preferably the carbonaceous feedstock is a coal. In coal gasification, a coal powder or aqueous slurry may be partially combusted in a gasifier in a non-catalytic process using oxygen or air and in the presence of steam at pressures up to about 75 bar abs and exit temperatures up to about 1450° C., preferably up to about 1400° C., to generate a raw synthesis gas comprising hydrogen and carbon oxides (carbon monoxide and carbon dioxide) and containing one or more sulphur compounds such as hydrogen sulphide and carbonyl sulphide.

Before the raw synthesis gas is subjected to the water gas shift reaction, the gas is preferably cooled and washed or filtered, e.g. to remove particulates such as coal ash.

Steam may be added to the raw synthesis gas e.g. by live steam addition or saturation or a combination of these, but is preferably added to the heated raw synthesis gas after it has passed through the tubes but before it is fed to the catalyst.

Depending on the upstream processing step to remove particulates from the syngas, it may be desirable to adjust the inlet temperature of the syngas passing to the tubes of the shift reactor according to the process design of the reactor and the operating performance of the shift catalyst. For instance, if the syngas is washed, thereby significantly cooling it, it may be advantageous to preheat the syngas passing to the reactor cooling tubes. Conversely, if the gas has been filtered upstream at a high temperature, it may be advantageous to cool the syngas. A suitable heat exchanger can be placed on the feed syngas stream to the cooling tubes. According to the particular details of the process, suitable media for heat exchange with the inlet gas may be, for example, another gas stream at a different temperature, steam or water. Furthermore, using such a heat exchanger, with a bypass provided around it, gives the ability to control the inlet temperature to the tubes and hence the inlet temperature to the catalyst bed, independently of variation in other parameters.

The shift catalyst may be any suitably stable and active water-gas shift catalyst, which may be in a particulate or monolith form. The raw synthesis gas contains one or more sulphur compounds and the water gas shift catalyst must operate in the presence of these compounds. In particular so-called "sour shift" catalysts may be used, in which the active components are metal sulphides. Suitable sour-shift catalysts include supported cobalt-molybdenum catalysts that form molybdenum sulphide in-situ by reaction with hydrogen sulphide present in the raw synthesis gas stream. Alternatively the catalysts may be supplied in a pre-sulphided form. Particularly preferred sour shift catalysts are supported cobalt-molybdate catalysts such as KATALCO K8-11 available from Johnson Matthey PLC, which consists of 3% wt. CoO and 10% wt. $MoO_3$ supported on an inert support containing magnesia and alumina.

If desired, the raw synthesis gas may be divided into first and second streams prior to the water-gas shift stage, with the first stream fed to the shift reactor where it is heated in the tubes and at least a portion passed over the sour shift catalyst, and the second stream, which may be termed the reactor by-pass stream, fed to the shifted gas stream or separately to downstream processes. The reactor by-pass stream may be in the range 0-50% vol of the raw synthesis gas, preferably 0-30% vol, more preferably 0-20% vol, particularly <10% vol. It is believed that generally the design of the reactor is enhanced by maximising the cooling capability, i.e. by maximising the gas flow through the tubes.

The synthesis gas that does not by-pass the water gas shift reactor is firstly fed to a plurality of tubes disposed in a bed of sour shift catalyst disposed within the shift reactor. The size of the reactor and the number of tubes is dependant upon the scale and composition of the raw synthesis gas and the required exit composition and may be determined using normal chemical engineering practices. The reactor and tubes should be arranged such that the catalyst may be readily loaded into the reactor and removed from the reactor. The feed to the tubes should be arranged such that the raw synthesis gas, once it has passed through the tubes is fed to the catalyst such that it passes in substantially the same direction through the catalyst, i.e. that the flow through the catalyst is co-current to the flow through the tubes. In this way the temperature profile through the bed may be controlled to provide pseudo-isothermal conditions, which we have found is beneficial in being able to minimise steam consumption without excessive by-product methane formation. Preferably, the reactor comprises a cylindrical shell fitted with a synthesis gas inlet and outlet and containing a bed of a particulate sour shift catalyst arranged so that the heated synthesis gas can flow along a vertical axis through the reactor and catalyst, with a plurality of tubes through which the synthesis gas may flow arranged vertically and co-axially through the catalyst and connected at one end by a suitable header arrangement to a source of raw synthesis and at the other end by a suitable collector arrangement to the line returning at least a portion of the heated gas, mixed with steam, to the catalyst. The size, pitch and number of tubes may be determined knowing raw synthesis gas composition and temperature and the desired amount of shift and catalyst volume, using normal engineering practices.

The raw synthesis gas passes through the tubes and is heated thereby cooling the catalyst and reacting gases. The raw synthesis gas therefore acts as the coolant for the reactor.

The heated raw synthesis gas may then be combined with steam and fed to the catalyst. In one embodiment, the heated raw synthesis gas is divided into first and second streams, with the first stream, optionally combined with steam and passed over the shift catalyst, and the second stream, which may be termed a catalyst bypass stream, fed to the shifted gas stream or downstream processes. This provides a means to control the overall conversion of CO. Where R ratio control is required for the process, 0-50%, of the heated raw synthesis gas may by-pass the catalyst. Where it is desirable to maximise conversion to hydrogen, it is best to have minimal (e.g. <10% vol) or no catalyst bypass stream or reactor bypass stream.

The heated raw synthesis gas, and steam are passed at elevated temperature and pressure, preferably temperatures in the range 250 to 500° C. more preferably 350-450° C., and pressure up to about 75 bar abs, over the water-gas shift catalyst. Preferably the catalyst is a particulate sour shift catalyst. The water-gas shift reaction occurs, consuming carbon monoxide and steam and forming carbon dioxide and hydrogen.

Where there is a bypass of raw synthesis gas around the water gas shift reactor (reactor bypass), or heated raw synthesis gas around the catalyst (catalyst bypass), it may be desirable to combine them before they are combined with the shifted gas stream or used in downstream processes.

The reactor by-pass stream, catalyst by-pass stream or combined by-pass stream may be subjected to a carbonyl sulphide (COS) hydrolysis step by passing the combined stream over a COS hydrolysis catalyst, such as a particulate alumina or titania based catalyst, disposed in a suitable vessel. In this step, the COS in the by-pass streams is hydrolysed by steam to form $H_2S$, which may be easier to remove in downstream processes. In such a COS hydrolysis step, essentially no water-gas shift reaction takes place.

Where the objective of the process is to maximise hydrogen yield, the product synthesis gas from the reactor may be fed to one or more additional water gas shift reactor stages. These may be conventional adiabatic sour shift stages or sour shift performed according to the present invention In order to generate a hydrogen-rich syngas, or a syngas suitable for methanol, FT hydrocarbon or synthetic natural gas production the process preferably further comprises the steps of:
 (i) cooling the shifted gas stream, or a mixture of the shifted gas stream and a bypass stream to below the dew point to condense water,
 (ii) separating the resulting condensates therefrom to form a dry gas stream,
 (iii) feeding the dry gas stream to a gas-washing unit operating by means of counter-current solvent flow, to produce a product synthesis gas and
 (iv) collecting the product synthesis gas from the washing unit.

The shifted gas stream may be subjected to these steps alone to form a dry shifted gas stream, or as a mixture with the reactor bypass stream and/or the catalyst bypass stream. Alternatively, a combined reactor bypass and catalyst bypass stream may be separately subjected to these steps to form a dry un-shifted by-pass stream, which is fed to the same or a separate gas washing unit. Where the dry un-shifted gas is fed to the same gas washing unit, preferably this un-shifted stream is fed to the gas washing unit such that the solvent flowing through said unit contacts first with the dry un-shifted synthesis gas and then the dry shifted gas stream.

The cooling step may be performed by heat exchange, e.g. with cold water, to cool the gases to below the dew point at which steam condenses. The resulting condensates, which comprise water and some contaminants, are separated.

The gases may be further cooled and dried, e.g. by means of chilled solvent, and then fed to a gas-washing unit operating by means of counter-current solvent flow. In the gas washing unit, also known as an acid-gas removal (AGR) unit, a solvent suitable for the dissolution/absorption of carbon dioxide flows counter-current to gas flowing through the unit and dissolves/absorbs carbon dioxide present in the gas stream. A small quantity of other gas components in the gas stream, particularly carbon monoxide, will also be co-absorbed. Contaminants present in the gas stream that may poison downstream catalysts, e.g. sulphur compounds such as $H_2S$ & COS, may also be removed to differing extents. Using AGR, $CO_2$ levels may be reduced to below 5 mole %, on a dry gas basis.

Suitable solvents for absorbing $CO_2$ include methanol, particularly where the synthesis gas is to be used to produce methanol, other alcohol or glycol products, such as glycols or polyethylene glycol ethers, and propylene carbonate. Methanol may be used at temperatures in the range −30 to −70° C. and at elevated pressures up to about 75 bar abs. Polyethylene glycol ether solvents may be used at higher temperatures, for example temperatures in the range −15 to 50° C. The operating pressure in the gas-washing unit may be up to about 75 bar abs. Due to the high solubility of $CO_2$ in chilled methanol, the amount of circulating solvent in a methanol-based gas-washing unit is low in comparison to the polyethylene glycol ether-based processes. Chilled Methanol may also be more effective in capturing $H_2S$ and COS and other minor contaminants (e.g. HCN and metal carbonyls), which could poison downstream catalysts. Accordingly, methanol is often the preferred solvent where a downstream catalyst is being used.

A gas-washing unit may comprise, for example, a column having a solvent inlet near the top and a solvent outlet near the bottom, down which a solvent suitable for the dissolution/absorption of carbon dioxide flows over one or more perforate trays or packing. The gases passing up through the column contact the solvent and carbon dioxide is dissolved/absorbed. The gases may leave the column near the top via a synthesis gas outlet. The synthesis gas is cold and may be used to cool the feed gases to the gas-washing unit using suitable heat exchange means such as a spiral wound heat exchanger. In one embodiment, the dry by-pass synthesis gas mixture and dry shifted gas stream are fed separately to the unit, with the separate feeds arranged such that that the solvent contacts first with the dry by-pass synthesis gas mixture and then the dry shifted gas stream. This is in contrast to previous processes, where a synthesis gas mixture is fed to a gas-washing unit so that the solvent contacts the gas mixture in one stage. We have found that by separately feeding the two different gas streams to the unit such that that the solvent contacts first with the dry raw gas mixture and then the dry shifted gas stream, the efficiency of the process is improved, which offers the potential for reduced CO co-absorption and an increased potential for methanol or liquid hydrocarbon production from a given quantity or raw syngas.

The sour shift reactor, bypasses and gas-washing stages are operated such that the synthesis gas collected from the gas-washing unit has the desired R ratio for the downstream use, where the application is for methanol production, FT hydrocarbon production or SNG production. This may be achieved for example by setting the bypass flow around the shift catalyst, as this governs the quantity of $CO_2$ formed from CO and subsequently removed in the gas-washing unit. Alternatively, the sour shift reactor, optional additional downstream sour shift stage or stages, and gas-washing stage may be operated such that the synthesis gas collected from the gas-washing unit is hydrogen rich, with minimal CO and $CO_2$ content, where this is desirable.

The synthesis gas generated by the process of the present invention may be used in the production of methanol or for the Fischer-Tropsch Synthesis of liquid hydrocarbons or the production of synthetic natural gas.

Methanol production is generally performed by passing a synthesis gas comprising hydrogen, carbon oxides and any inert gases at an elevated temperature and pressure through one or more beds of a methanol synthesis catalyst, which is often a copper-containing composition. Methanol is generally recovered by cooling the product gas stream to below the dew point of the methanol and separating off the product as a liquid. The process is often operated in a loop: thus the remaining unreacted gas stream is usually recycled to the synthesis reactor as part of the synthesis gas via a circulator. Fresh synthesis gas, termed make-up gas, is added to the recycled unreacted gas to form the synthesis gas stream. A purge stream is taken from the circulating gas stream to avoid the build up of inert gasses. The methanol synthesis may be performed at pressures in the range 40-150, and more conveniently in the range 45-120, bar abs. The temperature of the synthesis catalyst is suitably in the range 160-300° C.; preferably the peak temperature is below 285° C. The synthesis gas preferably enters the catalyst beds at a temperature in the range 200-250° C. and leaves the beds at temperatures preferably in the range 220-260° C. The synthesis catalyst is preferably a copper-based catalyst containing copper and compounds, e.g. oxides of zinc, aluminium, chromium, titanium, zirconium, and/or magnesium. The catalyst may be in the form of pellets, tablets or extrudates. Particularly preferred catalysts are described in U.S. Pat. No. 4,788,175.

The Fischer-Tropsch synthesis converts a mixture of carbon monoxide and hydrogen to hydrocarbons over reduced cobalt- or iron-based catalysts. In this case the $CO_2$, in contrast to methanol synthesis, is not a co-reactant with the CO. Because Fe-based catalysts normally have a significant water gas shift activity, whereas Co-based catalysts do not, it will usually be necessary to extract more $CO_2$ from the synthesis gas feed for Co-based Fischer-Tropsch synthesis as opposed to Fe-based one. The mixture of carbon monoxide and hydrogen fed to the catalyst typically has a hydrogen:carbon monoxide ratio in the range 1.4-2.5:1, depending on application and catalyst type. The reaction may be performed in a continuous or batch process using one or more stirred slurry-phase reactors, bubble-column reactors, loop reactors fluidised bed reactors or cooled fixed bed reactors. The process may be operated at pressures in the range 0.1-10 Mpa and temperatures in the range 150-350° C. The gas-hourly-space velocity (GHSV) for continuous operation is in the range 100-25000 $hr^{-1}$.

In one process to make synthetic natural gas, the synthesis gas comprising carbon monoxide and carbon dioxide and hydrogen is reacted over a reduced supported nickel-based catalyst in one or more reactors, preferably two or more reactors to form methane and water in a highly exothermic (methanation) reaction. If the feed gas contains carbon oxides and hydrogen in close to stoichiometric ratio (R=3.0), then a high purity methane stream (typically methane>95 vol %) can be produced, which can be used as a Synthetic Natural Gas.

In FIG. 1, a raw synthesis gas 10 containing one or more sulphur compounds is mixed with steam 12 and the resulting mixture heated in gas-gas heat exchanger 14 before being fed to the inlet of a sour shift reactor 16 containing a bed of a particulate Co/Mo sour shift catalyst. The synthesis gas passes through the reactor and the water-gas shift reaction takes place adiabatically with an increase in the temperature of the reacting synthesis gas. The hot shifted synthesis gas is recovered from the outlet of the reactor, cooled in heat exchanger 20 (where it may be used to superheat a steam stream) then gas-gas exchanger 14 (where it is used to heat the feed stream), and is passed via line 22 to two further heat exchangers 24 and 26 in series, where heat may be recovered by heating boiler feed water and generating steam. A reactor by-pass stream 30 (shown by a dotted line) runs from line 10 to line 22 to allow some of the raw synthesis gas to by-pass the shift reactor, to aid control of the extent of shift reaction.

Figure 2:
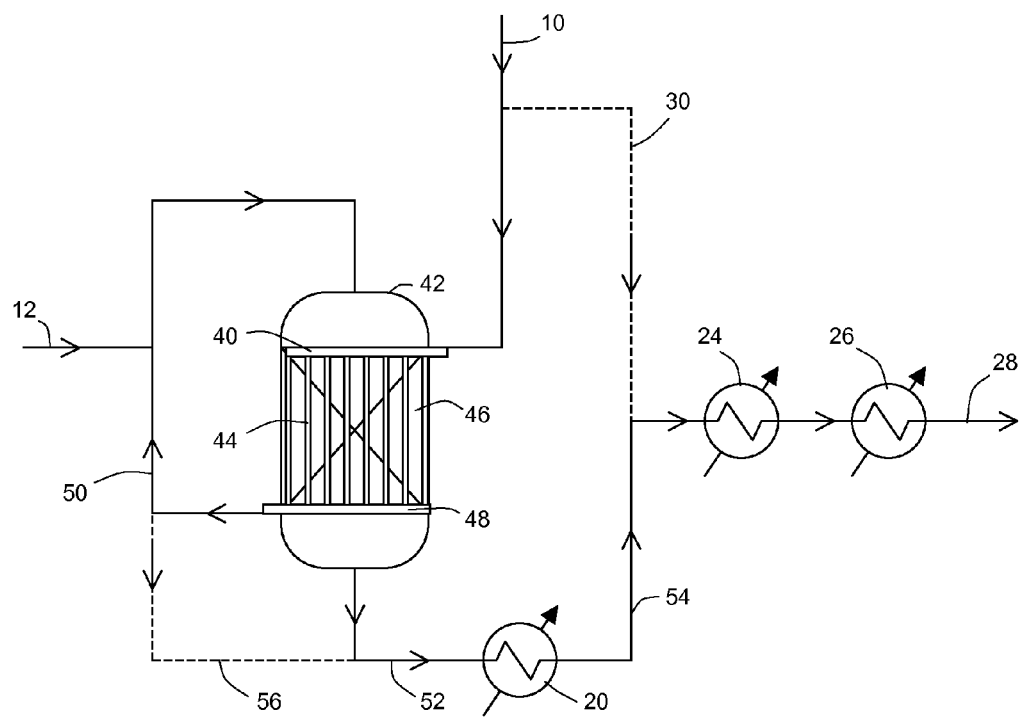
FIG. 2 is a depiction of one embodiment according to the present invention in which the synthesis gas mixture is heated in tubes disposed within the bed of sour shift catalyst and then passed through the catalyst in a co-current arrangement.

In FIG. 2 a raw synthesis gas 10 containing one or more sulphur compounds is fed to a header arrangement 40 disposed within a cylindrical sour shift reactor 42. The header arrangement is connected to a plurality of tubes 44 that pass vertically through a bed of particulate Co/Mo sour shift catalyst 46. The raw synthesis gas is able to pass from the header arrangement vertically through the tubes where it is heated (see FIG. 3 cooling stream) thereby cooling the catalyst reactant gases in the catalyst bed 46. The tubes are connected by a receiver arrangement at the other end that collect heated raw synthesis gas 50. The heated raw synthesis gas 50 is mixed with steam 12 and the resulting mixture fed to the surface of the catalyst bed. The feed arrangement is such that the heated raw synthesis gas and steam mixture passes through the bed of sour shift catalyst 46 vertically in substantially the same direction as the gas that passes through the tubes 44, i.e. the coolant and reactant gases are flowing co-currently through the reactor 42. The water-gas shift reaction takes place pseudo-isothermally (see FIG. 3). The hot shifted synthesis gas 52 is cooled in heat exchanger 20 (used e.g. for steam superheating) then is passed via line 54 to two further heat exchangers 24 and 26 in series. The resulting product synthesis gas 28 may be used in methanol production. A reactor by-pass stream 30 (shown by a dotted line) runs from line 10 to line 54 to allow some of the raw synthesis gas to by-pass the shift reactor. In addition a catalyst by-pass stream 56 (also shown by a dotted line) runs from line 50 to line 52 to allow some of the heated raw synthesis gas to by-pass the shift catalyst.

EXAMPLES

The invention is further illustrated by reference to the following calculated Examples. In the Examples the objective is to carry out water gas shift reaction to modify the stoichiometry of the synthesis gas for its utilisation in methanol production such that, after downstream Acid Gas Removal (AGR) unit, $CO_2$ is reduced to a level of 2 mol % on a dry gas basis, and R=2.1, where R is a ratio, defined as $([H_2]-[CO_2])/([CO]+[CO_2])$ and $[H_2]$, $[CO_2]$ and $[CO]$ are mol % of $H_2$, $CO_2$ and $CO$ after AGR.

Examples 1 to 3 are comparative examples based upon the flowsheet depicted in FIG. 1. Example 1 is the base case utilising an un-cooled, fixed-bed reactor, with an $H_2O/CO$ ratio in the feed gas to the shift vessel of 2.5:1. Examples 2 and 3 show two different designs, again with an un-cooled catalyst bed, which utilise an $H_2O/CO$ ratio in the feed gas to the shift vessel of 1.5:1.

Example 4 is according to the invention and is based upon the flowsheet depicted in FIG. 2, with feed syngas flowing co-currently in tubes through the bed, cooling the reacting gas.

In each example 29550 kgmols/hr of quenched feed raw synthesis gas from a coal gasifier (stream 10 in FIGS. 1 & 2), at 175° C. and 65 bar abs. requires to be treated. The composition is, as follows, in mol %: $H_2$=31.19%, CO=35.84%, $CO_2$=14.42%, $N_2$=0.88%, $CH_4$=0.38%, $H_2O$=16.49%, $H_2S$+COS=0.79%.

Steam is available at 70 bar abs. and superheated to 487° C.

For each case the total percentage conversion of CO is about 43.6%.

The apparatus was sized with a catalyst volume about 70 $m^3$, and a heat transfer coefficient per unit volume of 10,000 $W/m^3/°$ C., was used.

Table 1 shows key parameters for each example.

TABLE 1

| Stream | | Example 1 | Example 2 | Example 3 | Example 4 |
|---|---|---|---|---|---|
| Reactor bypass | % vol | 37.2 | 25 | 25 | 18 |
| Catalyst Bypass | % vol | NA | NA | NA | 6.5 |
| Steam/CO ratio inlet | mol/mol | 2.5 | 1.5 | 1.5 | 1.5 |
| Steam/feed syngas ratio | kg/kg | 0.402 | 0.245 | 0.245 | 0.25 |
| Steam flow | tes/hr | 244.6 | 148.8 | 148.8 | 152.2 |
| Catalyst volume | $m^3$ | 68.1 | 70.2 | 89.7 | 71.5 |
| Catalyst volume ratio* | | 1.00 | 1.03 | 1.32 | 1.05 |
| Inlet Temperature | ° C. | 330 | 330 | 300 | 416 |
| Exit Temperature | ° C. | 472 | 487 | 457 | 412 |
| Minimum bed temperature | ° C. | 330 | 330 | 300 | 394 |
| Maximum bed temperature | ° C. | 472 | 487 | 457 | 416 |
| Methane production ratio** | | 1.00 | 3.45 | 2.36 | 1.37 |

*Catalyst volume for example/catalyst volume for Example 1, base case.
**Methane production for example/methane production for example 1, base case.

Example 1, according to current practice, requires an adiabatic bed, where 244.6 tes/hr of steam is added. In the catalyst bed the gas stream heats up to 472° C. at the outlet.

In Example 2, approximately 96 tes/hr less steam is utilised. The catalyst bed inlet temperature is the same as Example 1. The catalyst volume required is approximately the same, but the exit temperature has increased significantly to 487° C. due to the lower mass throughput in the catalyst bed. The rate of production of methane is very dependent on temperature and hence much higher in Example 2 than Example 1, which will be disadvantageous for methanol synthesis.

In Example 3, approximately 96 tes/hr less steam is utilised. The catalyst exit bed temperature has now been reduced to 457° C., but the catalyst volume required is now 32% more than Example 1. As well as the evident disadvantage of having to provide extra catalyst for the duty, this additional catalyst provides extra residence time for methane production to occur. The level of methane production is significantly greater than Example 1 but less than Example 2.

In example 4, according to the invention, approximately 92.5 tes/hr less steam is utilised. 18% of the total feed gas bypasses the shift reactor, the remainder of the gas being used in the cooling tubes, heating up from 175° C. to 394° C.

Figure 3:
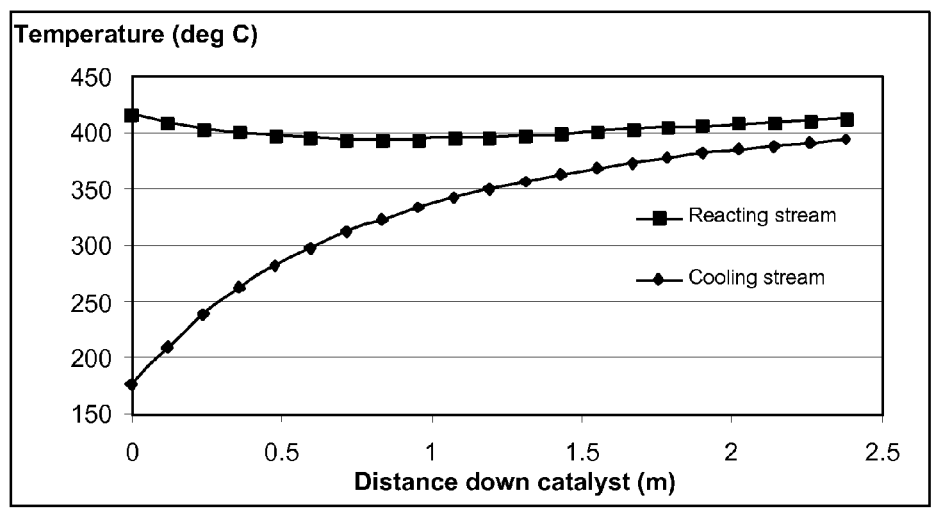
FIG. 3 is a graph depicting the temperature profile of the gas streams within the tubes and catalyst bed according to a calculated example for the embodiment depicted in FIG. 2.

93.5% of this stream is then mixed with 152.2 tes/hr of process steam before the mixture is passed through the catalyst bed. The temperature profiles for the co-current cooling and reacting streams through the reactor are shown in FIG. 3. Initially the reacting gas cools, because there is a large temperature differential between the reacting and cooling stream temperatures. Further down the reactor, as this differential narrows, the reacting stream starts to heat up again. Overall the temperature is constrained in a relatively narrow band (from 394° C. to 416° C.), for the design heat transfer coefficient selected. In design, the inlet temperature, exit temperature and operating temperature range can be altered by judicious selection of heat transfer coefficient and corresponding design of the cooling tubes. In operation, control of catalyst temperatures can be optimised by adjustment of tube inlet temperature.

In Example 4, the required catalyst volume is only marginally greater than Example 1. The level of methane production is slightly higher than Example 1, but far lower than Examples 2 and 3, due to the combination of lower peak temperature and catalyst volume and will be much more advantageous for methanol synthesis.

There are two further advantages, shown by this example 4. Firstly, a large external gas to gas heat exchange load is avoided as in Examples 1-3, because the equivalent heat exchange is performed inside the reactor. Secondly, because the reactor has a lower exit temperature than in Examples 2 and 3, the shifted gas stream will have a much superior equilibrium conversion of COS to $H_2S$ by hydrolysis. COS is a more difficult compound to remove in the downstream Acid Gas Removal unit and is a poison to methanol and FT synthesis and SNG catalysts.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A process for increasing the hydrogen content of a raw synthesis gas comprising hydrogen and carbon oxides and containing one or more sulphur compounds, comprising:
   (i) a heating stage comprising heating the raw synthesis gas and
   (ii) a shift stage comprising passing at least part of the heated raw synthesis gas and steam through a shift reactor containing a sour shift catalyst to form a shifted gas stream by a water-gas shift reaction;
   wherein the raw synthesis gas is heated, in the heating stage, by passing the raw synthesis gas through a plurality of tubes disposed within said shift catalyst in a direction co-current to the flow of said synthesis gas through the shift catalyst and the heated raw synthesis gas is divided into first and second streams in a catalyst by-pass stage, with the first stream passed over the shift catalyst and the second stream by-passing the shift catalyst, thereby forming a catalyst by-pass stream.

2. A process according to claim 1 wherein the raw synthesis gas containing one or more sulphur compounds is formed by gasification of a carbonaceous feedstock at elevated temperature and pressure, followed by cooling and either washing or filtering the resulting gas stream to remove particulate material.

3. A process according to claim 2 wherein the carbonaceous feedstock is coal.

4. A process according to claim 3 wherein the gasification is performed on a coal powder or aqueous slurry in a gasifier using oxygen or air and in the presence of steam at a pressure up to about 75 bar abs and an exit temperature up to about 1450° C.

5. A process according to claim 2 wherein, prior to the heating stage in the reactor, the raw synthesis gas temperature is adjusted to a suitable inlet temperature by heating or cooling the washed or filtered gasified feedstock.

6. A process according to claim 1 wherein the heated synthesis gas is subjected to the water-gas shift reaction in a vessel containing a supported cobalt-molybdenum catalyst.

7. A process according to claim 1 wherein the water gas shift reaction is performed at a temperature in the range of 250 to 500° C.

8. A process according to claim 1 wherein, upstream of the shift stage, the raw synthesis gas containing one or more sulphur compounds is divided into primary and secondary streams in a reactor by-pass stage, with the primary stream fed to the shift reactor is heated and at least a portion passed over the sour shift catalyst, and the secondary stream by-passing the shift reactor, thereby forming a reactor by-pass stream.

9. A process according to claim 1 wherein, upstream of the shift stage, the raw synthesis gas containing one or more sulphur compounds is divided into primary and secondary streams in a reactor bypass stage, with the primary stream fed to the shift reactor is heated and at least a portion passed over the sour shift catalyst, and the secondary stream by-passing the shift reactor, thereby forming a reactor by-pass stream, and
   wherein the catalyst by-pass stream is combined with the reactor by-pass stream, thereby forming a combined by-pass stream.

10. A process according to claim 9 wherein the catalyst by-pass stream and reactor by-pass stream are each 10% vol of the raw synthesis gas stream.

11. A process according to claim 9 wherein a by-pass stream selected from the catalyst by-pass stream, reactor by-pass stream, and combined by-pass stream is subjected to a carbonyl sulphide (COS) hydrolysis step by passing the stream over a COS hydrolysis catalyst prior to further downstream processing.

12. A process according to claim 1 wherein the catalyst by-pass stream is mixed with the shifted gas stream.

13. A process according to claim 12 wherein the mixed catalyst by-pass and shifted gas stream is subjected to one or more water-gas shift stages to further increase the hydrogen content of the synthesis gas.

14. A process according to claim 1 further comprising the steps of:
   (i) cooling the shifted gas stream, to below the dew point to condense water,
   (ii) separating the resulting condensates therefrom to form a dry shifted gas stream,
   (iii) feeding the dry shifted gas stream to a gas-washing stage having a gas-washing unit operating by means of counter-current solvent flow, to produce a product synthesis gas, and
   (iv) collecting the product synthesis gas from the washing unit.

15. A process according to claim 1 further comprising the steps of
   (i) combining the shifted gas stream and the catalyst by-pass stream,
   (ii) optionally performing one or more shift stages on the resulting mixture to increase the hydrogen content thereof, (iii) cooling the resulting mixture, to below the dew point to condense water,
(iv) separating the resulting condensates therefrom to form a dry gas mixture,
(v) feeding the dry gas mixture to a gas-washing stage having a gas-washing unit operating by means of counter-current solvent flow, to produce a product synthesis gas, and
(vi) collecting the product synthesis gas from the washing unit.

16. A process according to claim 9 wherein the combined by-pass stream is subjected to steps of
(i) cooling to below the dew point to condense water,
(ii) separation of the resulting condensates to form a dry un-shifted gas mixture,
(iii) feeding the dry un-shifted gas to a gas-washing unit operating by means of counter-current solvent flow, to produce a product synthesis gas and
(iv) collecting the product synthesis gas from the washing unit.

17. A process according to claim 16 wherein the dry un-shifted gas mixture is fed to a gas washing unit along with a dry shifted gas stream formed according to claim 15, such that the solvent flowing through said unit contacts first with the dry un-shifted gas and then a dry shifted gas stream.

18. A process according to claim 15 wherein the shift, by-pass, and gas washing stages are operated such that the product synthesis gas has a stoichiometry ratio, $R=(H_2-CO_2)/(CO+CO_2)$, in the range 1.4 to 3.3.

19. A process according to claim 18 wherein the stoichiometry ratio is in the range 1.4 to 2.5.

20. A process for the production of methanol comprising the steps of forming a synthesis gas having a stoichiometry ratio, $R=(H_2-CO_2)/(CO+CO_2)$, in the range 1.4 to 2.5 according to the process of claim 19, and passing said synthesis gas at an elevated temperature and pressure through one or more beds of a methanol synthesis catalyst.

21. A process for the synthesis of liquid hydrocarbons comprising the steps of forming a synthesis gas having a stoichiometry ratio, $R=(H_2-CO_2)/(CO+CO_2)$, in the range 1.4 to 2.5 according to the process of claim 19, then, adjusting the hydrogen to carbon monoxide ratio such that the synthesis gas has a hydrogen: carbon monoxide ratio in the range 1.5-2.5:1, and passing said synthesis gas at an elevated temperature and pressure over a cobalt- or iron-based Fischer-Tropsch catalyst in a suitable vessel.

22. A process for the production of a synthetic natural gas comprising the steps of forming a synthesis gas having a stoichiometry ratio, $R=(H_2-CO_2)/(CO+CO_2)$, in the range 2.8 to 3.3 according to the process of claim 18, and passing said synthesis gas over a supported Ni catalyst in one or more reactors.

\* \* \* \* \*